June 22, 1965     W. K. WIGAM     3,190,334

LOCKING AND SCRAPING WASHER

Filed Sept. 24, 1963

INVENTOR.
Wilhelm Klaus Wigam
BY
*Robert W. Beart*
ATTORNEY

United States Patent Office 3,190,334
Patented June 22, 1965

3,190,334
LOCKING AND SCRAPING WASHER
Wilhelm K. Wigam, Hamburg, Germany, assignor to Illinois Tool Works Inc., Chicago, Ill., a corporation of Delaware
Filed Sept. 24, 1963, Ser. No. 311,079
4 Claims. (Cl. 151—37)

This invention relates to washers for rotary clamping members such as nuts, bolts, and the like, and more particularly concerns a novel washer having locking means for the rotary clamping members and work engaging teeth for strip material which is secured together by the rotary clamping members.

Various fastening devices have been used with relatively sharp teeth to lockingly engage the fastening device to a work surface and prevent easy removal. In some instances, it is undesirable to deface or mar the work surface since it will lessen the reusability of the fastening device at the same location. As an example, it may only be necessary to scrape or clean a work surface of a sheet which has been painted or coated in some manner to allow metal contact of the fastening device with the work surface and provide an electrical connection. Under these circumstances, the locking function of the sharp teeth of the fastening device will be lost, and it becomes necessary to provide another means for locking the fastening device to the work surface while retaining the scraping or cleaning action of the fastening device. The present invention overcomes these difficulties by providing both a work scraping or cleaning means and a locking means for a fastening device as will hereinafter be described in detail.

An object of the present invention is to provide a novel washer with work scraping or cleaning means and locking means for a rotary clamping member, such as a nut or bolt, to provide metal contact with the washer and the work surface while retaining the washer in non-rotative position.

Another object of the present invention is to provide a novel washer with work engaging edges which as they impinge on a work surface act to scrape or clean the surface and not permanently deface the face thereof to permit reusability of the washer at the same location.

Another object of the present invention is the provision of a novel washer configured in such a manner that it will rotate with the fastening device during assembly and will hinder retrograde movement of the fastening device when assembled.

A further object of the present invention is to provide a fastening assembly having rotary clamping members for securing together previously coated metal sheets and at least one washer, having the features aforementioned, to provide an electrical connection for the metal sheets.

Still another object of the present invention is to provide a novel washer having a novel structural supporting means for the work scraping or cleaning means of the washer to insure that the latter means will perform its function.

Another object of the present invention is the provision of a novel washer which, in addition to the aforementioned objects, has a wrench engaging portion to facilitate removal of the washer with the rotary clamping members.

Still a further object of the present invention is the provision of a novel washer made of sheet metal which will permit easy and economical manufacture without unnecessary wastage of material.

The foregoing and other objects and advantages will be more apparent from the following detailed description, when considered in connection with the accompaning drawings wherein.

Figure 1:
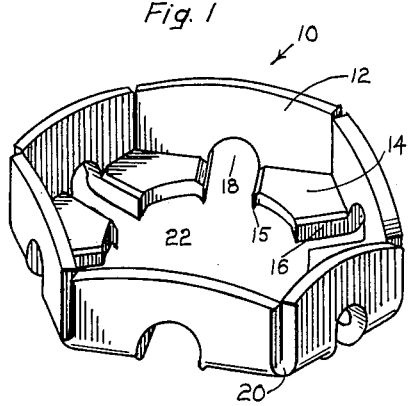
FIG. 1 is a perspective view of a novel washer embodying the features constituting the present invention.

Referring now to the drawings in more detail wherein like numerals have been employed to designate similar parts throughout the various figures, it will be seen that my invention includes a locking and work surface scraping washer designated generally by the numeral 10. The washer is in the form of an annular body having a central opening 22 therethrough to permit entry of the shank portion of a bolt member. A plurality of upstanding rectangularly shaped flange portions 12 are juxtaposed one another along complementary sides of the flange portions and are configured in such a manner to provide a polygonal shape, which is shown in the drawings as hexagonal in form. It is to be understood that the washer may take other forms and shapes, and that the hexagonal shape shown in the drawings is used only for illustrative purposes in describing the invention. The polygonal shape of the adjacent flange portions will normally be complementary to the shape of a nut or bolt head to allow the washer to turn with the rotary clamping member during assembly, but prevent its withdrawal when the washer is in contact with a work surface.

Figure 5:
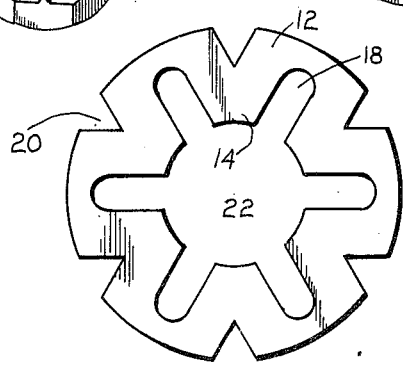
FIG. 5 is a plan view of a washer stamping embodying features of the present invention before it is bent into the shape shown by FIG. 1.

Extending substantially normal to the plane of the flange portions is a plurality of spaced tongue portions 14 which are each integrally joined to a pair of juxtaposed flange portions. As will be evident from an inspection of FIG. 1 of the drawing, the tongue portions 14 are integrally joined to the flange portions along the bottom side of the rectangularly shaped flange portions to provide a retaining means for a rotary clamping member. Each of the tongue portions 14 is separated by a radial slot 18 which extends from a central opening 22 of the washer, and along opposite sides of the tongue portions adjacent to the radial slots, a plurality of downwardly extending radial teeth 16 are provided. The teeth 16 are provided with a work engaging edge 15 which will scrape or clean a work surface which has previously been painted or coated. Because the teeth 16, and thus the work engaging edges 15, are structurally supported by a pair of juxtaposed flange portions, it will be evident that this structure will permit the work engaging edges to impinge on a work surface and act to clean or scrape the same. The flange portions 12, prior to being formed to their final shape, are separated by the V-shaped notch 20 which is shown in FIG. 5. Since the flange portions are bent along the apex of the V-shaped notch into the shape shown by FIGS. 1 and 2, it is to be noted that the tongue portions 14 are integrally joined and supported by the flange portions in a novel structural manner to facilitate the action of the work engaging edges 15.

Figure 2:
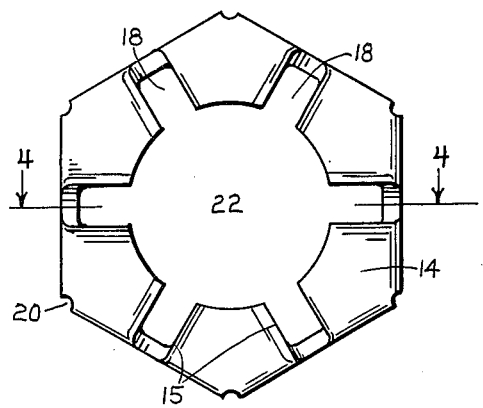
FIG. 2 is a bottom plan view of the washer of the present invention showing the hexagonal shape of the washer as used for illustrative purposes in describing the invention.
Figure 3:
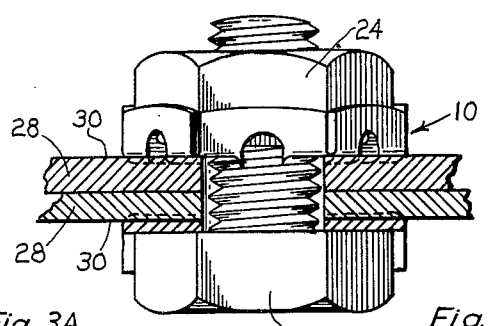
FIG. 3 is a side elevational view of the washer in a nut and bolt assembly.

FIG. 2 shows the hexagonal shape of the washer which is used with the hexagonal rotary clamping member in FIG. 3 for the purposes of describing the present invention. It is shown by FIG. 2 that, in the case of a hexagonally shaped washer, there are a plurality of radial slots 18, six in number, which intersect the midpoint of each flange portion 12 to provide six tongue portions 14. Obviously, a change in the shape of the washer will correspondingly alter the number of slots, etc.

Figure 4:
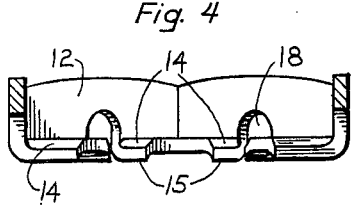
FIG. 4 is a transverse sectional view taken along line 4—4 of FIG. 2.

FIG. 4 is a transverse sectional view taken along the line 4—4 of FIG. 2 and indicates how the radial slots 18 project into the flange portions 12 to allow the work engaging edges 15 to scrape a work surface along the entire extent of the edge. FIG. 4 also indicates how the tongue portions 14 are slightly bowed to permit a distinct work engaging edge to be formed at opposite sides of each tongue portion 14. This bowing of the washer also provides a lock washer effect on a rotary clamping member when the parts are assembled and are formed against a work surface.

Figures 3A, 3B:
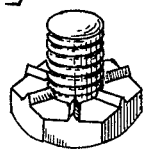
FIG. 3A is a perspective view of a scaled down bolt of the type having work engaging teeth which may be used in conjunction with the novel washer of the present invention in the assembly shown in FIG. 3.
FIG. 3B is a perspective view of a nut having work engaging teeth which may be used with the novel washer in the assembly shown in FIG. 3 when the washer is used in conjunction with a bolt member.

An assembly of the washer 10 with a hexagonally shaped nut and bolt member 24, 26 is shown in FIG. 3 of the drawing. The assembly of FIG. 3, where the nut and bolt member secure together a pair of flat metal sheets 28, is useful in certain cases where it may be necessary to provide an electrical connection through the sheets. In such a case, the washer 10 will be used with the bolt of FIG. 3A, or nut of FIG. 3B, or an identical washer for scraping or cleaning an exposed work surface 30 of the metal sheets to provide an electrical connection. The bolt and nut of FIGS. 3A and 3B have work engaging edges similar to the washer for scraping or cleaning a work surface. Thus, a washer 10 can be used with a nut as shown in FIG. 3 and a bolt having work engaging edges as shown in FIG. 3A, or the washer 10 may be used with a bolt having a head means for scraping one exposed surface and a nut of the type shown in FIG. 3B for scraping the other exposed surface, etc. However, because the washer of the present invention provides both a locking means for a rotary clamping member and a work scraping or cleaning means, it would be more desirable to use a pair of washers embodying the features of the present invention with a nut and bolt member to scrape the exposed work surfaces of secured flat metal sheets.

Figure 6:
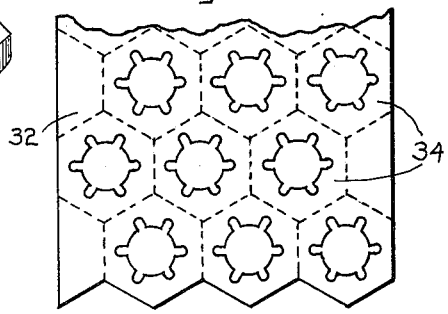
FIG. 6 is a plan view of a metal strip showing the manner in which washers may be strategically located to prevent unnecessary wastage of material.

FIG. 5 shows the washer 10 in die stamping form prior to the bending of the flange portions 12 in upstanding condition. The die stampings are cut from a metal sheet such as that shown by the numerals 32 in FIG. 6. To prevent unnecessary wastage of material, the die stampings may be positioned in the manner shown by FIG. 6 to provide easy and economical manufacture.

From the foregoing, it will be apparent that the present invention contemplates a locking and work surface scraping washer of extremely simple, yet practical, construction capable of being stamped and formed from sheet metal stock. The novel structural characteristics of the washer contemplated by the present invention provide rotary clamping member locking means and work surface scraping means, coupled with economy and ease of manufacture.

While the preferred embodiments of the present invention have been shown and described herein, it is obvious that many structural details may be changed without departing from the spirit and scope of the appended claims.

The invention is claimed as follows:

1. A fastening assembly comprising a locking and work surface scraping washer made of sheet metal for use with cooperating rotary clamping members such as a nut and bolt to electrically connect previously coated flat metal sheets secured together by the rotary clamping members, said washer being provided with a plurality of upstanding flange portions substantially parallel to the axis of the washer, said flange portions being juxtaposed one another and configured to provide a polygonal shape for the reception of one complementary shaped rotary clamping member to permit rotation of the washer therewith during assembly with said sheets, but preventing rotation of the member when in assembled condition with said sheets, a plurality of spaced tongue portions on the washer each integrally joined to a pair of juxtaposed flange portions and extending radially inwardly substantially perpendicular to the planes of the flange portions for supporting the tongue portions along the direction in which they extend, said tongue portions defining a central opening at the inner end thereof, each of said tongue portions being provided with a pair of radial edges, each of said edges being formed along their entire length to axially extend uniformly from said tongue portion in a direction generally opposite to that of the flange portions to provide sharp scraper teeth in a common plane for impinging upon and cleaning an exposed surface of one of the secured metal sheets, when rotatably forced by the rotary clamping member into engagement therewith, the other rotary clamping member being associated with means for impinging upon and cleaning an exposed work surface of the other metal sheet when forced into engagement therewith by said other rotary clamping member to provide an electrical connection through the clamping members to each of the metal sheets.

2. The assembly of claim 1 wherein the rotary clamping member received within the washer is a nut member and the other rotary clamping member is a bolt member having work scraping means on the bolt head undersurface.

3. The assembly of claim 1 wherein the rotary clamping member received within the washer is a bolt member, and the other rotary clamping member is a nut member having work scraping means formed thereon.

4. The assembly of claim 1 wherein the means associated with the other rotary clamping member comprises a second washer having the structural details of the first mentioned washer.

References Cited by the Examiner

UNITED STATES PATENTS

| 1,372,178 | 3/21 | Loving | 85—50 |
|---|---|---|---|
| 1,833,462 | 11/31 | Hagist | 151—37 |
| 1,916,525 | 7/33 | Olson | 151—35 |
| 2,128,429 | 8/38 | Olson | 151—37 |
| 2,257,479 | 9/41 | Olson | 151—35 |
| 2,278,062 | 3/42 | Koharovich | 151—38 |
| 2,562,032 | 7/51 | Gutensohn | 151—37 |

FOREIGN PATENTS 161,315  4/21  Great Britain.

EDWARD C. ALLEN, *Primary Examiner.*